(12) United States Patent
Liebman

(10) Patent No.: US 9,626,375 B2
(45) Date of Patent: Apr. 18, 2017

(54) SYSTEMS, COMPUTER READABLE STORAGE MEDIA, AND COMPUTER IMPLEMENTED METHODS FOR PROJECT SHARING

(76) Inventor: Andrew Liebman, Brookline, MA (US)

( * ) Notice: Subject to any disclaimer, the term of this patent is extended or adjusted under 35 U.S.C. 154(b) by 285 days.

(21) Appl. No.: 14/008,368

(22) PCT Filed: Apr. 6, 2012

(86) PCT No.: PCT/US2012/032535
§ 371 (c)(1),
(2), (4) Date: Feb. 19, 2014

(87) PCT Pub. No.: WO2012/139008
PCT Pub. Date: Oct. 11, 2012

(65) Prior Publication Data
US 2014/0164316 A1 Jun. 12, 2014

Related U.S. Application Data

(60) Provisional application No. 61/473,544, filed on Apr. 8, 2011.

(51) Int. Cl.
*G06F 17/30* (2006.01)
*G11B 27/034* (2006.01)
*G11B 27/34* (2006.01)

(52) U.S. Cl.
CPC ...... *G06F 17/30165* (2013.01); *G11B 27/034* (2013.01); *G11B 27/34* (2013.01)

(58) Field of Classification Search
CPC .................................................. G06F 17/30165
(Continued)

(56) References Cited

U.S. PATENT DOCUMENTS 5,649,200 A 7/1997 Leblang et al.
5,706,510 A 1/1998 Burgoon
(Continued)

FOREIGN PATENT DOCUMENTS

JP 2000-250799 9/2000
JP 2004-078535 11/2004
(Continued)

OTHER PUBLICATIONS

Notice of Allowance for U.S. Appl. No. 12/937,859, dated Mar. 12, 2015.
(Continued)

*Primary Examiner* — Thu-Nguyet Le
(74) *Attorney, Agent, or Firm* — Sean D. Detweiler, Esq.; Morse, Barnes-Brown & Pendleton, P.C.

(57) ABSTRACT

A system enables sharing and locking of metadata defining a NLE project. The system controls write access of metadata by transferring ownership of the metadata between various editor users through an intermediary of a server user. Transfers of ownership of metadata are initiated by editor users. Each editor user is enabled to (a) assume ownership of metadata owned by the server user; and (b) relinquish ownership of metadata he or she owns to the server user. Editor users are only permitted to modify metadata that they own, thereby forming a "check in" and "check out" system for controlling write access to metadata. In effect, metadata is "checked in" when an editor user cedes ownership of the metadata to the server user. Metadata owned by the server user is "checked out" when an editor user assumes ownership of the metadata by taking ownership of the metadata away from the server user.

20 Claims, 13 Drawing Sheets

(58) Field of Classification Search
USPC .................................................. 707/781
See application file for complete search history.

(56) References Cited

U.S. PATENT DOCUMENTS

| | | | |
|---|---|---|---|
| 5,883,670 A | 3/1999 | Sporer et al. | |
| 5,920,873 A * | 7/1999 | Van Huben | G06Q 10/04 |
| 6,044,374 A | 3/2000 | Nesamoney et al. | |
| 6,091,778 A | 7/2000 | Sporer et al. | |
| 6,167,083 A | 12/2000 | Sporer et al. | |
| 6,195,650 B1 | 2/2001 | Gaither et al. | |
| 6,230,185 B1 | 5/2001 | Salas et al. | |
| 6,301,105 B2 | 10/2001 | Glorioso et al. | |
| 6,321,219 B1 | 11/2001 | Grainer et al. | |
| 6,337,880 B1 | 1/2002 | Cornog et al. | |
| 6,389,433 B1 | 5/2002 | Bolosky et al. | |
| 6,457,021 B1 | 9/2002 | Berkowitz et al. | |
| 6,469,711 B2 | 10/2002 | Foreman et al. | |
| 6,519,571 B1 | 2/2003 | Guheen et al. | |
| 6,628,303 B1 | 9/2003 | Foreman et al. | |
| 6,768,996 B1 | 7/2004 | Steffens et al. | |
| 6,996,588 B2 | 2/2006 | Azagury et al. | |
| 7,028,262 B2 | 4/2006 | Estrada et al. | |
| 7,062,532 B1 | 6/2006 | Sweat et al. | |
| 7,069,594 B1 | 6/2006 | Bolin | |
| 7,124,366 B2 | 10/2006 | Foreman et al. | |
| 7,293,033 B1 | 11/2007 | Tormasov et al. | |
| 7,610,219 B2 | 10/2009 | Sayed | |
| 7,783,665 B1 | 8/2010 | Tormasov et al. | |
| 8,751,604 B2 | 6/2014 | Liebman | |
| 2001/0006453 A1 | 7/2001 | Glorioso et al. | |
| 2001/0014892 A1 | 8/2001 | Gaither et al. | |
| 2001/0024472 A1 | 9/2001 | Sporer et al. | |
| 2001/0040592 A1 | 11/2001 | Foreman et al. | |
| 2001/0051955 A1 | 12/2001 | Wong | |
| 2002/0072956 A1 * | 6/2002 | Willems | G06Q 10/04 705/7.31 |
| 2002/0073114 A1 | 6/2002 | Nicastro | |
| 2002/0073144 A1 | 6/2002 | Katoh et al. | |
| 2002/0129274 A1 | 9/2002 | Baskey et al. | |
| 2002/0138843 A1 | 9/2002 | Samaan et al. | |
| 2002/0149618 A1 | 10/2002 | Estrada et al. | |
| 2002/0165856 A1 | 11/2002 | Gilfillan et al. | |
| 2003/0046639 A1 * | 3/2003 | Fai | G06Q 10/10 |
| 2003/0095789 A1 | 5/2003 | Wakimoto et al. | |
| 2003/0097276 A1 | 5/2003 | Kirkland | |
| 2003/0227487 A1 | 12/2003 | Hugh | |
| 2004/0002990 A1 | 1/2004 | Sander et al. | |
| 2004/0049520 A1 | 3/2004 | Bowers et al. | |
| 2004/0056882 A1 | 3/2004 | Foreman et al. | |
| 2004/0066395 A1 | 4/2004 | Foreman et al. | |
| 2004/0071441 A1 | 4/2004 | Foreman et al. | |
| 2004/0088313 A1 | 5/2004 | Torres | |
| 2004/0199578 A1 | 10/2004 | Kapczynski et al. | |
| 2005/0086296 A1 * | 4/2005 | Chi | G06Q 10/10 709/203 |
| 2005/0091289 A1 | 4/2005 | Shappell et al. | |
| 2005/0108685 A1 * | 5/2005 | Ta | G06F 8/71 717/120 |
| 2006/0026213 A1 | 2/2006 | Yaskin et al. | |
| 2006/0053442 A1 | 3/2006 | Ridderheim et al. | |
| 2006/0092178 A1 | 5/2006 | Tanguay et al. | |
| 2006/0098941 A1 | 5/2006 | Abe et al. | |
| 2006/0184673 A1 * | 8/2006 | Liebman | G06F 17/3028 709/225 |
| 2006/0253542 A1 | 11/2006 | McCausland et al. | |
| 2007/0011304 A1 | 1/2007 | Error | |
| 2007/0022215 A1 | 1/2007 | Singer et al. | |
| 2007/0078768 A1 | 4/2007 | Dawson | |
| 2007/0094328 A1 | 4/2007 | Birch | |
| 2007/0094601 A1 | 4/2007 | Greenberg et al. | |
| 2008/0112683 A1 | 5/2008 | Lin et al. | |
| 2008/0256242 A1 | 10/2008 | Liebman | |
| 2009/0037520 A1 | 2/2009 | Loffredo | |
| 2009/0164902 A1 | 6/2009 | Cohen et al. | |
| 2010/0281372 A1 | 11/2010 | Lyons et al. | |
| 2011/0026898 A1 | 2/2011 | Lussier et al. | |
| 2011/0167036 A1 | 7/2011 | Liebman | |
| 2011/0196842 A1 * | 8/2011 | Timashev | G06F 11/1469 707/679 |

FOREIGN PATENT DOCUMENTS

| | | |
|---|---|---|
| JP | 2007-011844 | 1/2007 |
| JP | 2010-079444 | 4/2010 |
| WO | WO 99/26170 | 5/1999 |
| WO | WO 99/46934 | 9/1999 |
| WO | WO 2005/089446 | 9/2005 |
| WO | WO 2007/082171 | 7/2007 |
| WO | WO 2009/129252 | 10/2009 |
| WO | WO 2009/155578 | 12/2009 |

OTHER PUBLICATIONS

Non-Final Office Action for U.S. Appl. No. 12/999,964, dated Oct. 6, 2015.
International Search Report for International Application PCT/US2012/032535, dated Jul. 13, 2012.
Björn Adamski, "MXF-Erweiterung für QuickTime," FKT Fernseh Und Kinotechnik, Fachverlag Schiele & Schon GMBH., Berlin, DE, 62(4): 2008.
Supplementary European Search Report for European Application No. 09731871.1, mailed Nov. 10, 2011.
International Search Report for International Application PCT/US2009/048056, dated Feb. 1, 2010.
Supplementary European Search Report for European Application No. 09767886, mailed Nov. 4, 2011.
Supplementary European Search Report for European Application No. 09731871.1, mailed Oct. 14, 2011.
International Search Report for International Application PCT/US2009/048056, dated Nov. 25, 2009.
Notice of Allowance for U.S. Appl. No. 11/403,036, dated Apr. 23, 2012.
Notice of Allowance for U.S. Appl. No. 12/102,563, dated Mar. 9, 2010.
Non-Final Office Action for U.S. Appl. No. 11/403,036, dated May 14, 2009.
Non-Final Office Action for U.S. Appl. No. 11/403,036, dated Sep. 23, 2010.
Non-Final Office Action for U.S. Appl. No. 12/999,964, dated Mar. 29, 2012.
Non-Final Office Action for U.S. Appl. No. 12/937,859, dated Mar. 19, 2012.
Final Office Action for U.S. Appl. No. 11/403,036, dated Mar. 11, 2010.
Final Office Action for U.S. Appl. No. 11/403,036, dated Mar. 1, 2011.
Final Office Action for U.S. Appl. No. 12/999,964, dated Oct. 22, 2012.
Final Office Action for U.S. Appl. No. 12/937,859, dated May 2, 2013.
Non-Final Office Action for U.S. Appl. No. 12/999,964, dated Jun. 18, 2013.
Final Office Action for U.S. Appl. No. 12/999,964, dated Sep. 24, 2013.
Non-Final Office Action for U.S. Appl. No. 13/584,149, dated Sep. 12, 2013.
Notice of Allowance for U.S. Appl. No. 13/584,149, dated Jan. 30, 2014.
Supplementary European Search Report for European Application No. 12767666.6, mailed Nov. 4, 2014.
Non-Final Office Action for U.S. Appl. No. 12/937,859, dated Jul. 10, 2014.
Non-Final Office Action for U.S. Appl. No. 12/999,964, dated Sep. 10, 2014.
Final Office Action for U.S. Appl. No. 12/937,859, dated Jan. 22, 2015.

(56) References Cited

OTHER PUBLICATIONS

Lowry, "Hacker's Guide to QuickTime," 2004, http://home.sol.se/michael/qtguide/.
Final Office Action for U.S. Appl. No. 12/999,964, dated Feb. 23, 2015.
Tortoises SVN Course, Baidu Library, B370606121, Nov. 16, 2010.
Final Office Action for U.S. Appl. No. 12/999,964, dated May 10, 2016.
Notice of Allowance for U.S. Appl. No. 12/999,964, dated Sep. 26, 2016.

* cited by examiner

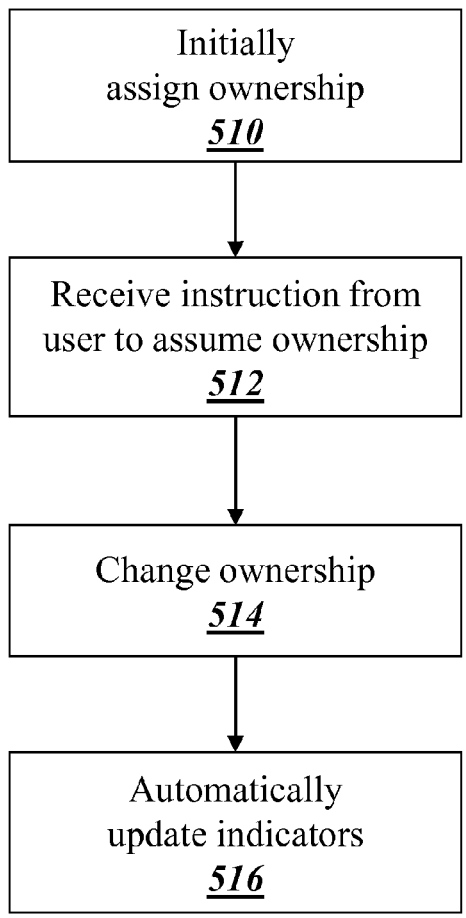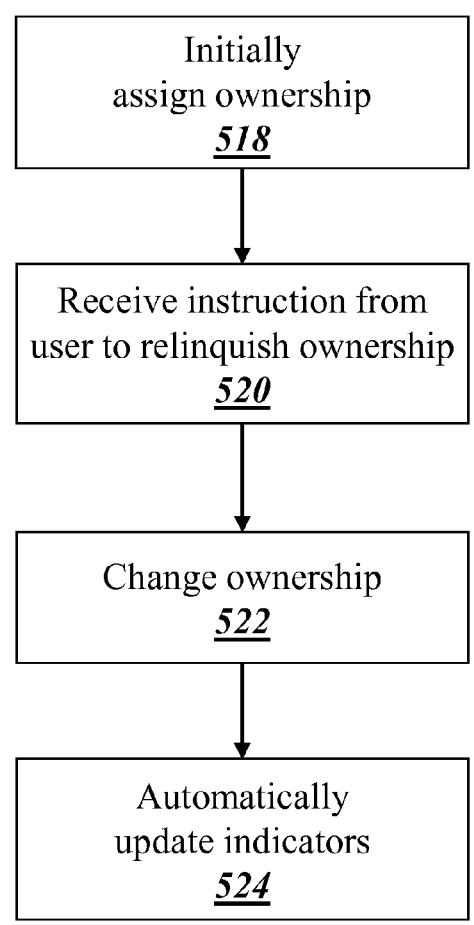
*FIG. 5A*  *FIG. 5B*

```
[root@es-vmwaredemo demo1]# ls -lah
total 68K
drwxrws--T 4 editshare editors 4.0K 2011-04-06 10:52 ./
drwxrws--T 5 editshare editors 4.0K 2011-04-05 14:05 ../
-rw-r----- 1 andy      editors    0 2011-04-05 13:35 Act_1.fcp
-rw-r----- 1 editshare editors    0 2011-04-05 13:36 Act_2.fcp
-rw-r----- 1 jeff      editors  45K 2011-04-05 14:07 fcptest.fcp
drwxrws--T 2 editshare editors 4.0K 2011-04-05 14:07 resource.frk/
drwxrws--T 3 editshare editors 4.0K 2011-04-05 14:18 Rushes/
-rw-r----- 1 editshare editors   20 2011-04-05 13:10 .sps_lp
[root@es-vmwaredemo demo1]#
```

*FIG. 7*

```
[root@es-vmwaredemo demo1]# ls -lah
total 68K
drwxrws--T 4 editshare editors 4.0K 2011-04-06 10:52 ./
drwxrws--T 5 editshare editors 4.0K 2011-04-05 14:05 ../
-rw-r----- 1 andy      editors    0 2011-04-05 13:35 Act_1.fcp
-rw-r----- 1 jeff      editors    0 2011-04-05 13:36 Act_2.fcp
-rw-r----- 1 jeff      editors  45K 2011-04-05 14:07 fcptest.fcp
drwxrws--T 2 editshare editors 4.0K 2011-04-05 14:07 resource.frk/
drwxrws--T 3 editshare editors 4.0K 2011-04-05 14:18 Rushes/
-rw-r----- 1 editshare editors   20 2011-04-05 13:10 .sps_lp
```

*FIG. 8*

```
[root@es-vmwaredemo Rushes]# ls -lah
total 60K
drwxrws--T 3 editshare editors 4.0K 2011-04-05 14:18 ./
drwxrws--T 4 editshare editors 4.0K 2011-04-06 10:52 ../
drwxrws--T 2 editshare editors 4.0K 2011-04-05 14:18 resource.frk/
-rw-r----- 1 editshare editors  47K 2011-04-05 14:18 Rushes 1.fcp
```

*FIG. 9*

```
[root@es-vmwaredemo Rushes]# ls -lah
total 60K
drwxrws--T 3 editshare editors 4.0K 2011-04-05 14:18 ./
drwxrws--T 4 editshare editors 4.0K 2011-04-06 10:52 ../
drwxrws--T 2 editshare editors 4.0K 2011-04-05 14:18 resource.frk/
-rw-r----- 1 jane      editors  47K 2011-04-05 14:18 Rushes 1.fcp
```

*FIG. 10*

SYSTEMS, COMPUTER READABLE STORAGE MEDIA, AND COMPUTER IMPLEMENTED METHODS FOR PROJECT SHARING

RELATED APPLICATIONS

This application is a national stage filing under 35 U.S.C. 371 of International Application No. PCT/US2012/032535, filed Apr. 6, 2012, which claims priority to, and the benefit of, U.S. Provisional Application No. 61/473,544, filed Apr. 8, 2011, for all subject matter common to both applications. The disclosure of said applications are hereby incorporated by reference in their entirety. International Application No. PCT/US2012/032535 was published under PCT Article 21(2) in English.

FIELD OF THE INVENTION

The present invention relates to project sharing systems for enabling collaboration among multiple users on shared projects. More particularly, embodiments of the present invention relate to the locking of bin files, project files, and other collections of metadata for non-linear video editing projects.

BACKGROUND OF THE INVENTION

In existing project sharing computer systems for sharing non-linear video editing projects, files or bins containing metadata (e.g., references to clips, sub-clips, etc.) are shared among various users and located on a central server accessible to the users via a user client, such as on a personal computer. Some such systems do not offer any sort of protection against one user overwriting the changes of another. For example, in some such systems, if two users open the same bin or project file simultaneously, both of the users can be provided write access, such that the version ultimately committed to disk is the one that is saved last.

Other file sharing systems create a user folder for each user, and then automatically set both the ownership and the permissions to files according to the particular user folder in which a file resides. Providing this type of control over access to files enables each user to readily read and write files that clearly belong to that user, while simultaneously blocking the user from receiving write access to any other user's user folder and corresponding contents.

Such a system, however, suffers from several drawbacks. The overall clarity of bin or project file organization of such a system is hindered by the fact that proper permissions are only achieved when a project consisting of many bin and project files is dispersed among users. Achieving proper permissions to files involves continuously moving files from folder to folder, which can make tracking or locating a particular file difficult. This is particularly true as the number of users on a project grows. For example, a user that is looking for a file in a particular project being worked on by 20 users may be required to search 19 different user folders before identifying the desired file.

Furthermore, given the dispersal of files of a single project across many different folders, it is difficult to provide a convenient and comprehensive single-screen view of all files associated with a single project. This can make managing projects and tracking their progress difficult. It also impedes the ability to quickly view the partition of work among various users on a project and compare their relative workloads, e.g., for managerial purposes.

Great difficulty exists in automatically assigning both ownerships and permissions in a manner that enables convenient transfer of exclusive write access rights between multiple users working on a single set of files. Other attempts involve creating copies of files, which can become computationally expensive. Yet other attempts involve creating complex link structures, but this can result in risk of broken links when files are moved or updated. No existing system readily enables automation of the various desirable features described herein.

SUMMARY

There is a need for a project sharing system that provides automated control over access rights to files while maintaining a centralized directory structure where the bin and project files, as well as information related to the particular associated users to whom the files belong, can easily be located and comprehensively viewed. The present invention is directed toward further solutions to address this and other needs, in addition to having other desirable characteristics that will be appreciated by one skilled in the art upon reading the present specification.

In accordance with an example embodiment of the present invention, a computer implemented project sharing system includes metadata stored in a non-transitory computer readable storage device. The metadata can define a part of a non-linear video editing project. Permissions on the metadata can be stored in a non-transitory computer readable storage device, and the permissions can enable a group of one or more editor users to read the metadata and enable only an owner of the metadata to modify or delete the metadata. A server device can be configured to control write access to the metadata by transferring, using at least one processor, ownership of the metadata to or from a server user that is not an editor. If a first editor user of the one or more editor users has ownership of the metadata, the first editor user can be enabled to relinquish ownership of the metadata by instructing the server device to transfer ownership of the metadata to the server user and each of the one or more editor users without ownership of the metadata can be preventing from instructing the server device to transfer ownership of the metadata. If the server user has ownership of the metadata, any one of the one or more editor users can be enabled to assume ownership of the metadata by instructing the server device to transfer ownership of the metadata from the server user to that one of the one or more editor users.

In accordance with example aspects of the present invention, the metadata can be stored in a file stored in a directory, and the permissions on the metadata can include directory-level permissions and file-level permissions. The directory-level permissions can include a sticky bit. Alternatively or additionally, the metadata can be stored in one or more database entries of a database. Instructions can be stored on at least one non-transitory computer readable device, and execution of the instructions by at least one processor can cause a graphical user interface to be presented on at least one presentation device. The graphical user interface can enable instructions to transfer ownership of the metadata to be sent to the server device. The graphical user interface can include a current status indicator for the metadata, and the current status indicator can indicate, to one of the one or more editor users, that the metadata is currently available to be checked out, currently checked out by that one of the one or more editor users, or currently checked out by a different one of the one or more editor users. The server device can run on a Linux based, a Unix based, or a Unix-like operating system.

In accordance with an example embodiment of the present invention, a computer implemented method is provided. Permissions can be set, using at least one processor, on metadata stored in a non-transitory computer readable storage device. The permissions can enable a group of one or more editor users to read the metadata and can enable only an owner of the metadata to modify or delete the metadata. Write access to the metadata can be controlled by transferring, using at least one processor and upon receiving an instruction through at least one input device, ownership of the metadata to or from a server user that is not an editor. If a first editor user of the one or more editor users has ownership of the metadata, the first editor user can be enabled to relinquish ownership of the metadata by instructing the server device to transfer ownership of the metadata to the server user and each of the one or more editor users without ownership of the metadata can be prevented from instructing the server device to transfer ownership of the metadata. If the server user has ownership of the metadata, any one of the one or more editor users can be enabled to assume ownership of the metadata by instructing the server device to transfer ownership of the metadata from the server user to that one of the one or more editor users.

In accordance with example aspects of the present invention, the first user can have ownership of the metadata in the computer implemented method, and the method further can include receiving, through at least one input device, an instruction from the first user editor to relinquish ownership of the metadata. Additionally, based on the received instruction, ownership of the metadata can be transferred, using the at least one processor, from the first user to the server user. Furthermore, the server user can have ownership of the metadata, and the method further can include receiving, through at least one input device, an instruction from one of the one or more user editors to assume ownership of the metadata. Additionally, based on the received instruction, ownership of the metadata can be transferred, using the at least one processor, from the server user to the one of the one or more user editors. The metadata can be stored in a file stored in a directory, and wherein the permissions on the metadata comprise directory-level permissions and file-level permissions. The directory-level permissions can include a sticky bit. The metadata can be stored in one or more database entries of a database. Instructions can be stored on at least one non-transitory computer readable device, and execution of the instructions by at least one processor can cause a graphical user interface to be presented on at least one presentation device. The graphical user interface can include a current status indicator for the metadata, and the current status indicator can indicate, to one of the one or more editor users, that the metadata is currently available to be checked out, currently checked out by that one of the one or more editor users, or currently checked out by a different one of the one or more editor users.

In accordance with an example embodiment of the present invention, an interactive electronic display of information is provided for at least a first editor user of a non-linear video editing program. The first editor is assigned to a non-linear video editing (NLE) project that includes a plurality of metadata. The interactive display includes a plurality of metadata indicators representing the plurality of metadata defining the non-linear video editing project. Each metadata of the plurality of metadata can be owned by an editor user representing an editor assigned to the NLE project or by a server user that does not represent an editor assigned to the NLE project. For each metadata of the plurality of metadata, an associated status indicator can be included in the interactive display. The associated status indicator can be selected from the group consisting of: a first status indicator indicating that of the metadata by the server user; a second status indicator indicating ownership of the metadata by the first editor user; and a third status indicator indicating ownership of the metadata by an editor user that is not the first editor user.

In accordance with example aspects of the present invention, the first editor user can be permitted write access only to the metadata of the plurality of metadata that is owned by the first editor. The first status indicator and the second status indicator can each be selectable. For each first status indicator included in the display, selection of the first status indicator can cause a server device to transfer from the first user to the server user, using at least one processor, ownership of the metadata associated with the selected first indicator. For each second status indicator included in the display, selection of the second status indicator can cause a server device to transfer from the server user to the first user, using at least one processor, ownership of the metadata associated with the selected second indicator. For each metadata of the plurality of metadata, the first status indicator can indicate that the first user editor owns the metadata and has checked out the metadata, the second status indicator can indicate that the first editor user does not own the metadata and is enabled to check out the metadata, and the third status indicator can indicate that the first editor user does not own the metadata and is not enabled to check out the metadata.

BRIEF DESCRIPTION OF THE FIGURES

These and other characteristics of the present invention will be more fully understood by reference to the following detailed description in conjunction with the attached drawings, in which:

FIG. 5A is a flow chart depicting a method for enabling an editor user to assume ownership of a file, according to an example embodiment of the present invention;

FIG. 5B is a flow chart depicting a method for enabling an editor user to relinquish ownership of a file, according to an example embodiment of the present invention;

FIG. 7 is a screen shot of example ownerships and permission for a directory "demo1" and files contained therein, as viewed on an example server prior to an editor user, jeff, requesting to receive write access and to check out the file "Act_2.fcp", according to example aspects of the present invention;

FIG. 8 is a screen shot of the example ownerships and permission of FIG. 7 for the directory "demo1" and its files contained therein, as viewed on the example server subsequent to the editor user, jeff, requesting to receive write access and ownership of the file "Act_2.fcp", according to example aspects of the present invention;

FIG. 9 is a screen shot of example ownerships and permission for a directory "Rushes" and its files contained therein, as viewed on an example server wherein all files are owned by the server user, herein referred to as "editshare", according to example aspects of the present invention;

FIG. 10 is a screen shot of the example ownerships and permission of FIG. 9 for the directory "Rushes" and its files contained therein, as viewed on the example server subsequent to an editor user, "jane", requesting to receive write access to the file "Rushes_1.fcp" and receiving ownership of the file, according to example aspects of the present invention.

DETAILED DESCRIPTION

Figure 1:
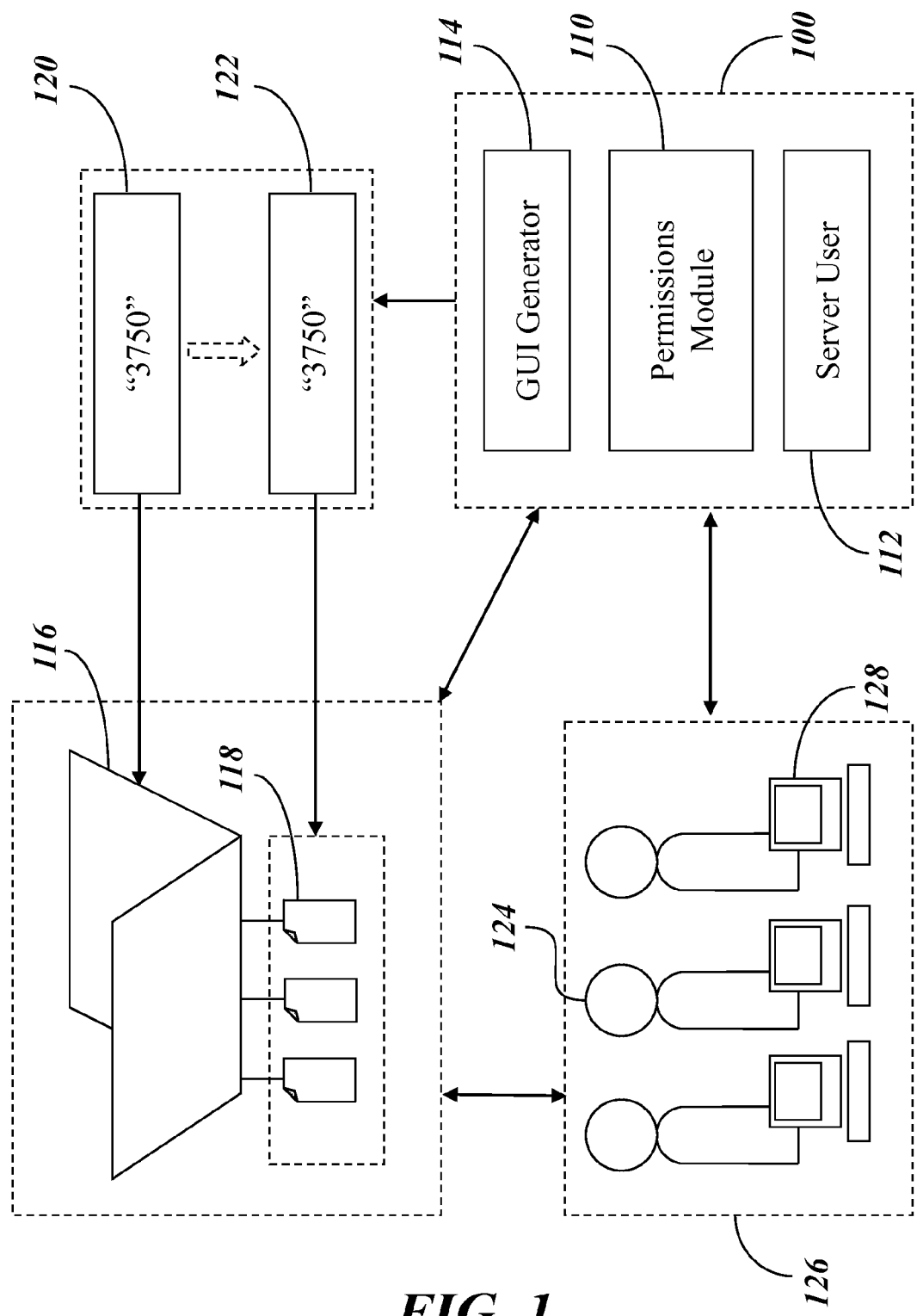
FIG. 1 is an illustrative diagram of a system for controlling exclusive write access by transferring ownership between a plurality of editor users, according to an example embodiment of the present invention.

An illustrative embodiment of the present invention relates to a computer implemented method, computer implemented system, and computer readable storage medium for enabling sharing and locking of metadata forming some or all of a project on a non-linear video editing program (e.g., Avid, Final Cut Pro, etc.). In the illustrative embodiment, the system is configured to control write access of metadata by transferring ownership of the metadata between various editor users (i.e., human editors that are working collaboratively on a shared non-linear video editing project). Notably, the system transfers ownership between various editor users through an "intermediary" referred to herein as a "server user." The server user can be controlled by a computer device such as a server. The server user does not represent, in the system, any of the human editors assigned to the non-linear video editing project. Transfers of ownership of metadata can be initiated by editor users. More specifically, in the illustrative embodiment, each editor user is enabled to (a) assume ownership of metadata owned by the server user; and (b) relinquish ownership of metadata he or she owns to the server user. Furthermore, in the illustrative embodiment, only the owner of metadata is permitted to modify that metadata. Accordingly, the server user provides a point of transfer of ownership between editor users, through which editors may safely transfer write access of collections of metadata without creating unnecessary copies of metadata, and the like.

Thus, in using ownership transfer to enable editor users assigned to an NLE project to assume and cede exclusive write access to metadata, systems of the present invention provide a "check in" and "check out" system that does not require the creation of copies or versions of metadata, and that does not require moving the location of the metadata (or the files, database objects, etc. in which they are contained). Moreover, unlike conventional check in-check out systems, embodiments of the present invention provide an extremely convenient and non-computationally expensive "neutral ground" for metadata that is not checked out by any editor user: the server user. In effect, in systems according to embodiments of the present invention, metadata is "checked in" when an editor user cedes ownership of the metadata to the server user. Metadata owned by the server user is "checked out" when an editor user assumes ownership of the metadata by taking ownership of the metadata away from the server user. Only the editor user who has checked out metadata is enabled to modify and save changes to the metadata. This allows editor users to safely edit portions of the NLE project that they are working on without risk of overwrite by other editor users. Thus, illustrative embodiments can provide a system that enables convenient file sharing without the need for moving files, creating copies of files, or having permissions assigned manually.

Accordingly, permissions to metadata can be assigned in such a way as to provide a plurality of different editor users with exclusive write access to metadata that they own. Moreover, this type of permission structure can be provided to the editor users without sacrificing any of the editor users' ability to create new metadata within a directory whose contents (e.g., files containing the metadata, database entries containing the metadata, etc.) are owned by the plurality of different editor users. For example, in systems according to embodiments of the present invention that utilize a Unix-like operating system and for which metadata is stored in file(s) in a directory structure, editor users having ownership of files containing metadata defining at least one NLE project can be provided with write access at the file-level to the files that they own. Furthermore, for any file not owned by one or more editor users but for which read permission by the one or more editor users of the file is desired, those one or more editor users (e.g., by virtue of their being assigned to the NLE project to which the metadata belongs) can be provided read access to the files at the file-level and write access to the files at the directory-level (e.g., by defining a "group class" with read-write access and including such one or more editor users in the group class, as would be appreciated by one of skill in the art upon reading the present specification). Furthermore, in such example embodiments, a sticky bit can be applied to any such directory (to which editor users are provided write access), so as to ensure that only the owner of each file in the directory is enabled to exercise directory-level write permissions on the file (e.g., renaming, deleting, and moving that file), while still permitting other editor users with write access to the directory to create, in that directory, new files containing metadata that further defines or contributes to the NLE project. In this manner, for such embodiments in which the metadata defining an NLE project is stored in files, exclusive write access to metadata can be controlled by the system through the use of specifically assigned file-level permissions and directory-level permissions on the files containing the metadata.

Furthermore, all ownerships and current statuses of the metadata can be conveniently presented in a single view to each user. For example, each editor user can be provided with indicators indicating whether each grouping of metadata (e.g., each file containing metadata, etc.) is (a) checked out by that user; (b) checked out by another editor user; or (c) available to be checked out. This can enable users to easily and conveniently view the ownership and current statuses of all metadata forming a single NLE project within a single window.

An illustrative embodiment will now be described in which the metadata locking system is implemented by transferring ownership (and exclusive write access) specifically to files containing metadata. For example, such files can include bin files produced by NLE software like Avid, "monolithic" project files produced by NLE software like Final Cut Pro (e.g., .fcp files), and the like. However, the present invention is not limited to these illustrative embodiments described in detail herein. It should be appreciated that the system described herein for transferring ownership of files can similarly be applied to any other suitable mechanism or format in which metadata is stored. For example, in one alternative embodiment described in greater detail herein, metadata is stored in database objects, and thus, permissions to the metadata are capable of being manipulated at the level of individual pieces of metadata. One of skill in the art will appreciate yet other forms and mechanisms for storing metadata that permit the transfer of ownership and the transfer of exclusive write access among a plurality of editor users through the intermediary of a "server user."

It should be appreciated that "metadata" herein refers to both a plurality of metadata and individual metadata (e.g., both singular and plural usage). The present invention is not limited to specific applications of the novel metadata locking scheme to either a plurality of metadata or individual metadata. Rather, ownership of groups of metadata and of individual metadata (e.g., stored in groups or individually in files, database entries, etc.) can be utilized herein with embodiments of the present invention.

FIGS. 1 through 11, wherein like parts are designated by like reference numerals throughout, illustrate example embodiments of a system for sharing metadata according to the present invention. Although the present invention will be described with reference to the example embodiments illustrated in the figures, it should be understood that many alternative forms can embody the present invention. Those of skill in the art will additionally appreciate different ways to alter the parameters of the embodiments disclosed, in a manner still in keeping with the spirit and scope of the present invention.

FIG. 1 depicts an illustrative computer implemented system 100 for enabling the functions of the present invention described in detail herein, in addition to other functions that will be readily appreciated by one skilled in the art upon reading the present specification. The system 100 includes a permissions module 110, a server user 112, and a graphical user interface (GUI) generator 114. The system 100 also includes at least one directory 116 which can contain one or more files 118 containing metadata defining one or more non-linear video editing projects, referred to herein as "NLE projects." Each directory 116 can have one or more permissions 120 assigned thereto by the permissions module 110. Similarly, each of the files 118 containing the metadata can have one or more permissions 122 assigned thereto by the permissions module 110. As such, the permissions on the files 118 dictate permissions on the metadata defining the NLE project(s).

The system 100 is coupled to one or more one user clients 128 each operated by an editor user 124 assigned to work on the NLE project(s) contained in the directory 116. The one or more user clients 128 can be connected directly to the system 100. Alternatively, the one or more user clients 128 can be connected to the system 100 using any suitable communication network connection (not shown), including an Ethernet connection, a connection over the Internet, and any other known network connection.

Although the GUI generator 114 is a component of the system 100 in the example embodiment of FIG. 1, in other illustrative embodiments of the present invention, the GUI generator 114 alternatively is located on each of the user clients 128.

The one or more editor users 124 form a user group 126 that is associated with the directory 116. The user group 126 can have specific group-level permissions to the directory 116. For example, in illustrative embodiments, the user group 126 defines a "group class" of permissions, as would be appreciated by one of skill in the art. Optionally, the server user 112 can be a member of the user group 126, as would be appreciated by one of skill in the art upon reading the present specification. As would be appreciated by one of skill in the art upon reading the present invention, multiple directories 116 can be included in the system 100, such that each directory 116 is associated with a user group 126 containing one or more editor users 124 assigned to one or more NLE projects contained in the directory 116.

Via their respective user clients 128, the editor users 124 can access the directory 116 as enabled by the permissions 120 on the directory 116. Similarly, the editor users 124 can access the files 118 contained in the directory 116 as enabled by the permissions 122 on the files 118. In an example embodiment, the permissions 120, 122 are defined such that: (a) out of the editor users 124, only the editor user 124 having ownership of a file 118 is enabled to modify, delete, move, or rename the file 118; (b) the user group 126 is given read access and write access to the directory 116 and thus is enabled to create new files 118 in the directory 116; and (c) no access is granted to "other" editor users (not shown in FIG. 1) that are neither members of the user group 126 nor an owner of the file 118.

One skilled in the art will appreciate a wide variety of different types, combinations, and variations of permissions that can be utilized upon reading the present specification. All such alternatives and modifications are contemplated within the scope of the present invention. Embodiments of the present invention are not limited to the particular selection of permissions that are described herein.

Accordingly, the permissions at the directory level can be set to limit any access, even read-only access, to only the members of the project space user group, as opposed to allowing a user's membership in a general "editors" user group (e.g., the user group 126) to determine access. In illustrative embodiments, the permissions 120 on the directory 116 are different from the permissions 122 on files 118 contained in the directory 116. For example, in embodiments implemented for Unix-like operating systems, a sticky bit can be utilized to dictate that the owner of a file 118 is the only one of the editor users 124 in the user group 126 that is permitted to modify, rename, move, and/or delete the file 118. In contrast, without the use of a sticky bit, the user or group owner of directory 116 is permitted to delete, rename, or move files 118 contained in the directory 116. The directory 116 can be set to be owned by the server, the server user 112, or another non-editor "generic" owner, e.g., to prevent editor users 124 from receiving the authority to change the permissions 120 or ownerships on the directory 116.

Accordingly, as described previously herein, for implementations of the system 100 implemented on Unix-like operating system (e.g., a Linux based operating system, a Unix based operating system, etc.), the permissions 120, 122 can include one or more sticky bits. In the example embodiment provided herein, the sticky bit can be added to the directory permissions, e.g., to provide any particular editor user 124 with the exclusive ability to modify, delete, rename, or move the files 118 that are owned by the particular editor user 124 (thereby protecting the user's work from being overwritten by another editor user 124) without compromising or negatively affecting the ability of other editor users 124 assigned to the NLE project associated with the directory 116 to create, within the directory 116, files 118 containing additional metadata further defining or contributing to the NLE project(s) associated with the directory 116. Moreover, in some embodiments, additional sticky bit(s) can be included, e.g., each applied to a sub-level directory contained within the directory 116.

The permissions module 110 can be configured to automatically assign the permissions 120, 122 based on predetermined permission settings, which can be stored in the permissions module 110. As examples, one or more of the sets of predetermined permission settings can be preprogrammed into the permissions module 110; can be selected by an editor user 124, system administrator, or root level user upon creation thereof by the editor user 124, system administrator, or root level user; can be based on previously created directories 116; can be based on previously created files 118; can be predetermined in some other way; or can be any combination thereof. The GUI generator 114 can be configured to automatically create a user interface at all or some of the user clients 128 that provides editor users 124 with information in the form of one or more display indicators regarding ownership, permissions, locations, check-out information, check-out history, any other information, or any combination thereof.

Figure 6:
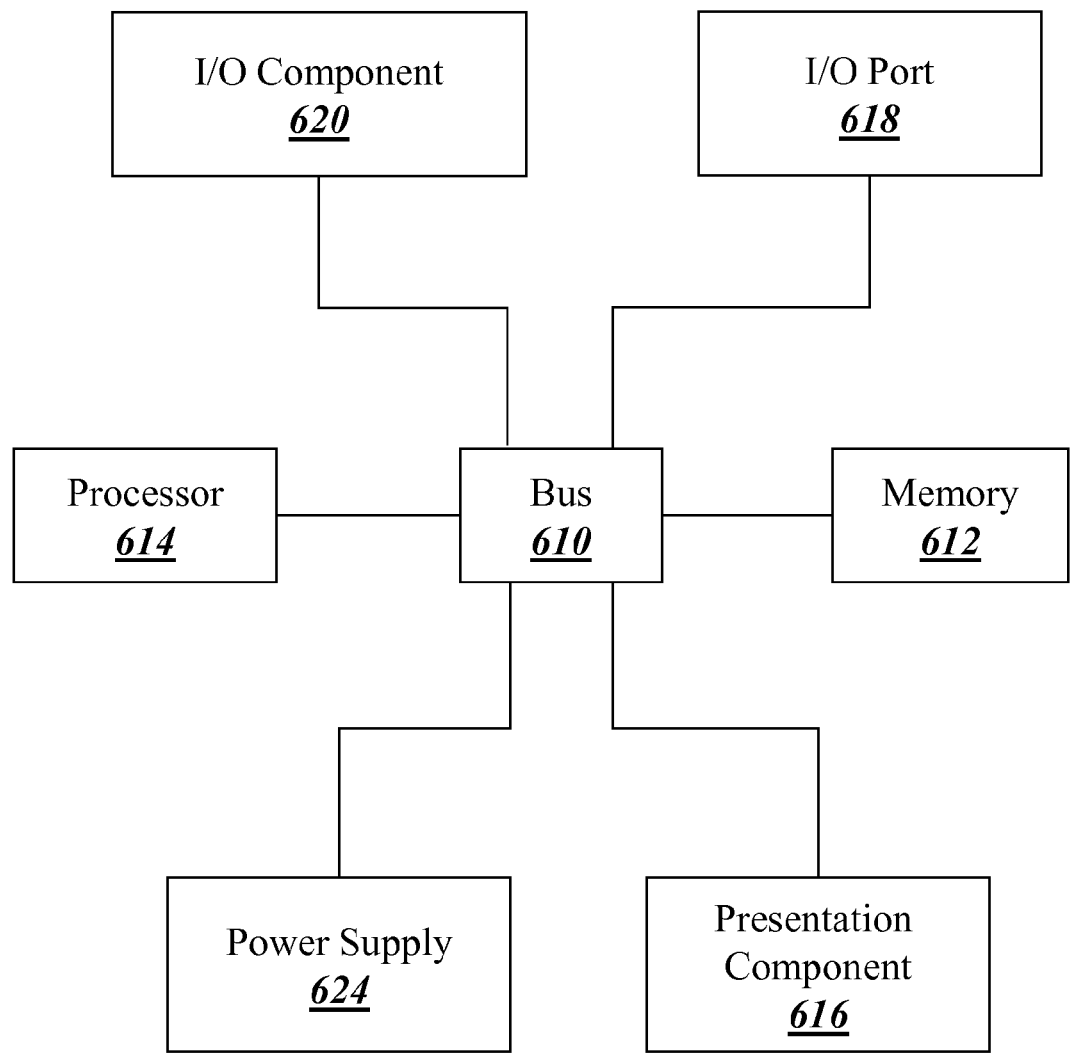
FIG. 6 is an illustrative diagram depicting an example computing device for implementing embodiments of the present invention.

The server user 112 can be a fully automated user entity and can be controlled, for example, by a computing device such as a server device (including a server device comprising a computer readable medium and implemented according to the computing device 600 depicted in FIG. 6 and described in detail herein). Similarly to editor users 124, the server user 112 also can receive ownership of files 118 and/or directories 116. In the example embodiment implemented for NLE programs, the server user 112 provides a mechanism by which editor users 124 are enabled to transfer ownership of a file 118 among themselves. More specifically, editor users 124 are enabled to instruct the system 100 to transfer ownership to and from the server user 112, thereby allowing the editor users 124 to pass ownership of files to one another through the intermediary of the server user 112. Furthermore, there may be a provision for the implementation of a limited number of administrative users who are granted the specific privilege to modify file ownership (e.g., take ownership away from a particular editor user 124). Likewise, there may be a provision for the implementation of "restricted rights users" for the editor users 124 who cannot take control or ownership of any files 118, and who are not permitted to write any files 118 to any directories 116. Accordingly, it should be appreciated that the permissions 120, 122 can be set to provide exceptions to the access rights of the particular editor users 124, and/or to provide different levels of access for different types of editor users 124.

Editor users 124 are enabled to use their respective user clients 128 to instruct the permissions module 110 to change the ownership of a directory 116 and/or file 118. In the example embodiment described herein, any given editor user 124 is enabled to instruct the permissions module 110 only to (a) change ownership of a file 118 from that particular editor user 124 to the server user 112, and (b) change ownership of a file 118 from the server user 112 to that particular editor user 124. In this manner, editor users 124 can be prohibited from instructing the permissions module 110 to change ownerships of a file 118 directly from any first editor user 124 to any second editor user 124.

Accordingly, the permissions module 110 generally can be equipped with the capability to change the ownership of any directory 116 and file 118, and more specifically can be equipped with the capability to transfer ownership of any file 118 between editor users 124 and the server user 112 (in both directions).

Specific transfer capabilities provided to the editor users 124 and described herein, as well as other interactions with the system 100, are enabled by the one or more user clients 128. The user client 128 can be operated on a user workstation, which can be any suitable computing device capable of operating the user client 128, including, by way of example, a "laptop," a "desktop," a "hand-held device," a "mobile device," a "tablet computer," an additional "computer server", a "portable transceiver," a "set-top box" (e.g. for Internet TV), and any other computing device. Accordingly, any of the features, components, and functions of the system 100 described herein (including the GUI/display) can be customized and/or altered to accommodate the specific type, operation, and connection of the workstation with which the system 100 is communicating.

More specifically, editor users 124 can interact with one or more GUIs created by the GUI generator 114 and provided to the editor users 124 as displays at their respective user clients 128 on a user workstation. The GUI generator 114 can automatically update information presented in the GUIs on the user clients 128 to reflect changes in ownerships and/or the status of a file 118. Specifically, the GUI generator 114 automatically updates ownership indicators and status indicators at the user clients subsequent to changes thereto. The GUI generator 114 can generate displays that include any of the example display features described herein and depicted in FIGS. 2 through 4B.

Figure 2:
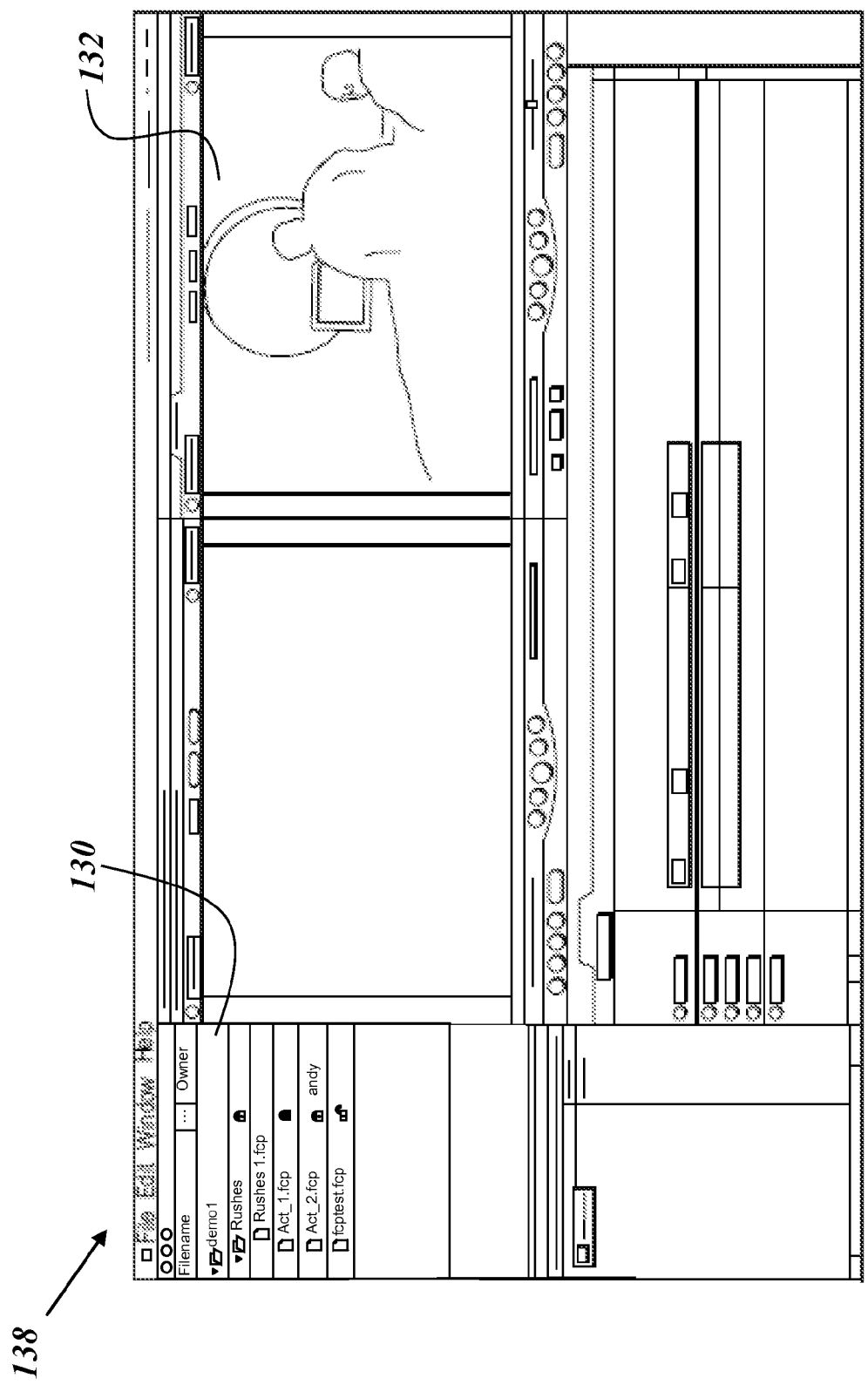
FIG. 2 is a screen shot depicting an editor user's display that includes an example user client running within the environment of an NLE program, according to example aspects of the present invention.

FIG. 2 depicts a screen shot of an example user client 138 implemented as a browser window 130 running within the environment of an NLE program 132. In the example embodiment depicted in FIG. 2, upon launching, the browser window 130 automatically resumes the same size and position on the user's display and/or with respect to the environment of the NLE program 132 that the browser window 130 occupied at the end of the editor user's most recent session. In the example described herein, the browser window 130 is depicted for an editor user 124 who will be referred to herein as "jeff."

Figure 3A:
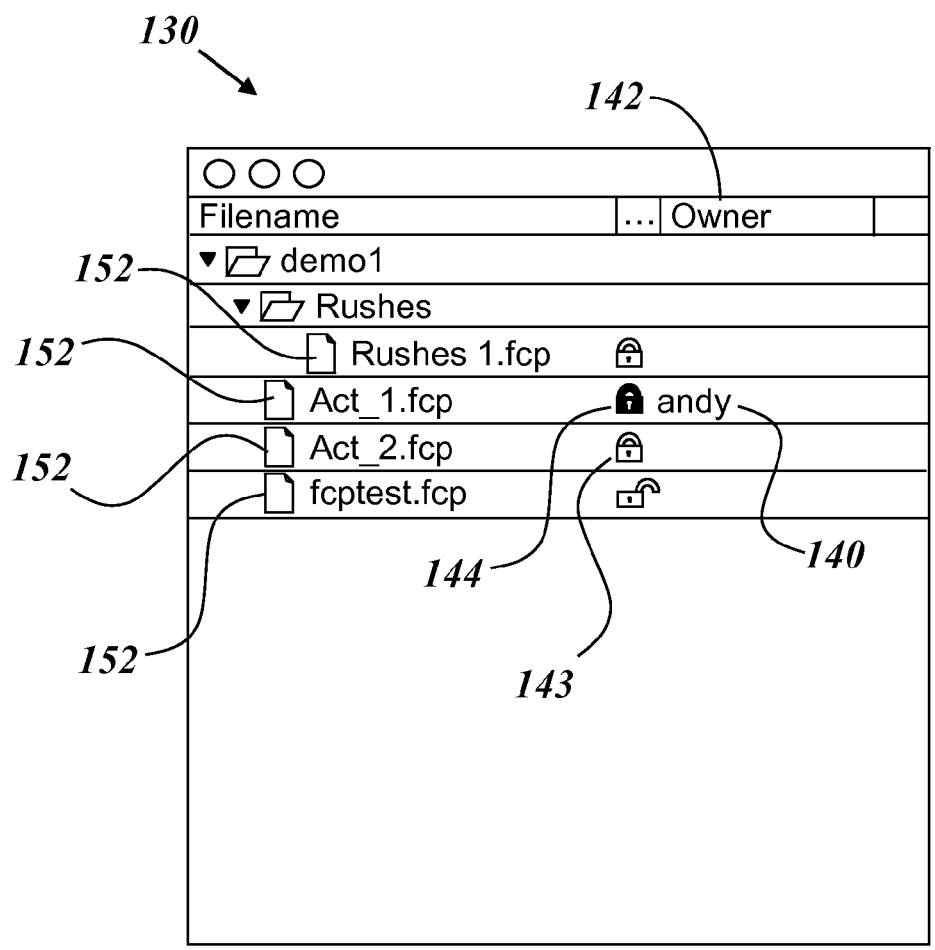
FIG. 3A is a screen shot of the user client of FIG. 2, prior to an action by an editor user, "jeff", according to example aspects of the present invention.
Figure 3B:
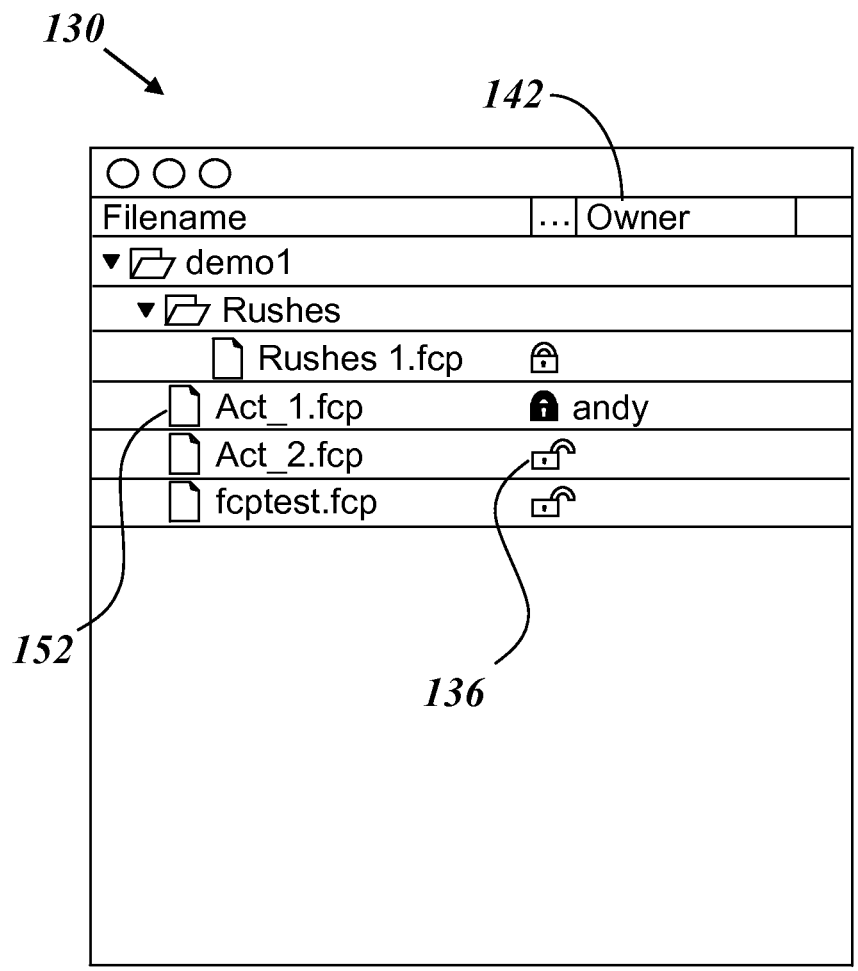
FIG. 3B is a screen shot of the user client of FIG. 3B, subsequent to an action to by the editor user, "jeff", according to example aspects of the present invention.

FIG. 3A depicts a close-up screen shot of the browser window 130 depicted in the corner of jeff's NLE program 132 in FIG. 2. The browser window 130 can be any suitable interactive electronic display of information. In the example embodiment of FIGS. 3A and 3B, the metadata is stored in the files 118 (e.g., bin files, project files, etc.) stored in the directory 116. Accordingly, the browser window 130 presents the directory structure that includes the directory 116 with the files 118 contained therein. As depicted in FIGS. 3A and 3B, the directory 116 (labeled "demo1" in this example) is indicated in the browser window 130 by a folder icon and the files containing the metadata are indicated by file icons. Accordingly, each folder icon indicates a directory in a non-transitory computer readable storage device that is associated with the NLE project and in which are located the files 118.

A plurality of metadata indicators 152 representing the metadata defining the NLE project are included in the browser window 130. More specifically, given that the metadata is stored in the files 118 in the example embodiment of FIGS. 3A and 3B, the metadata indicators 152 more specifically can comprise file indicators, each of which represents a file containing metadata defining or contributing to the NLE project. The browser window 130 additionally includes numerous metadata status indicators providing an indication of the status of the metadata defining or contributing to the NLE project. Accordingly, in the example embodiment of FIGS. 3A and 3B, the metadata status indicators included in the browser window 130 more specifically can comprise file status indicators.

In the example embodiment of FIGS. 3A and 3B, three different file status indicators are utilized, including a locked file indicator 144, an unlocked file indicator 136, and a claimable file indicator 143. In the example embodiment of FIGS. 3A and 3B, the locked file indicator 144 indicates that a file has been checked out by another editor user besides jeff, is owned by another editor user besides jeff, and is read only to jeff. The claimable file indicator 143 indicates that a file is available to be checked out and thereby "claimable" by jeff. The unlocked file indicator 136 indicates that a file is checked out by jeff, owned by jeff, and writable only by jeff.

Accordingly, a file that is "checked out" is a file for which ownership has been assigned to one of the editor users 124. A file that is "available to be checked out" is a file for which ownership has been assigned to the server user 112.

In the example embodiment of FIGS. 3A through 4B, the locked file indicator 144 includes a solid, closed icon of a lock. The unlocked file indicator 136 includes an open icon of a lock. The claimable file indicator 143 includes a hollow, closed icon of a lock. In addition, the file indicators 136, 143, 144 can be color-coded, to provide additional indication to users of the status of the associated files. For example, all of the locked file indicators 144 can be colored red, all of the claimable file indicators 143 can be colored yellow, and all of the unlocked file indicators 136 can be colored green.

The browser window 130 also can include owner indicators 140 indicating which particular editor user 124 owns a particular file that is checked out. For example, the owner indicators 140 can include a text string depicting a name of an owner, such as "andy." in the browser window 130 of the example embodiment of FIGS. 3A through 4B, the owner indicators 140 are placed under an "Owner" column 142. In the example embodiment of FIGS. 3A through 3B, an owner indicator 140 is only presented for files that are owned by editor users 124 that are not jeff. If a file has been assigned to jeff or to the server user 112, then there is no corresponding owner indicator under the "Owner" column 142.

FIG. 3B depicts a resulting browser window 130 subsequent to an action by jeff of assuming ownership of a file entitled "Act_2.fcp" by instructing the permissions module 110 to transfer ownership (and thus write access) of "Act_2.fcp" from the server user 112 to jeff. Accordingly, in FIG. 3A, the file "Act_2.fcp" is presented with a claimable file indicator 143, since at this point the server user 112 owns the file. On the other hand, in FIG. 3B, the file "Act_2.fcp" is presented with a locked file indicator 136, since at this point jeff owns the file. The instruction to claim ownership of a file currently owned by the server user 112 can be implemented using any suitable command, including selecting (e.g., by clicking) the claimable file indicator 143 indicating that a file is unassigned and available to be checked out.

Figure 4A:
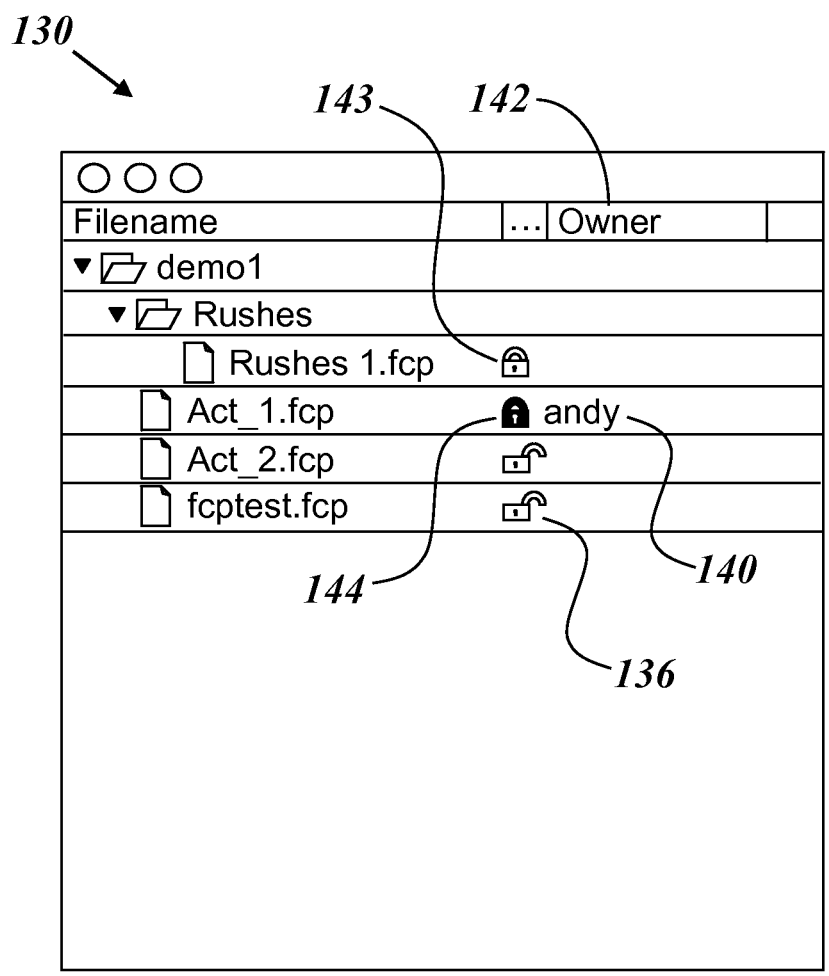
FIG. 4A is a screen shot of a user client, prior to an action by another editor user, "jane", according to example aspects of the present invention.
Figure 4B:
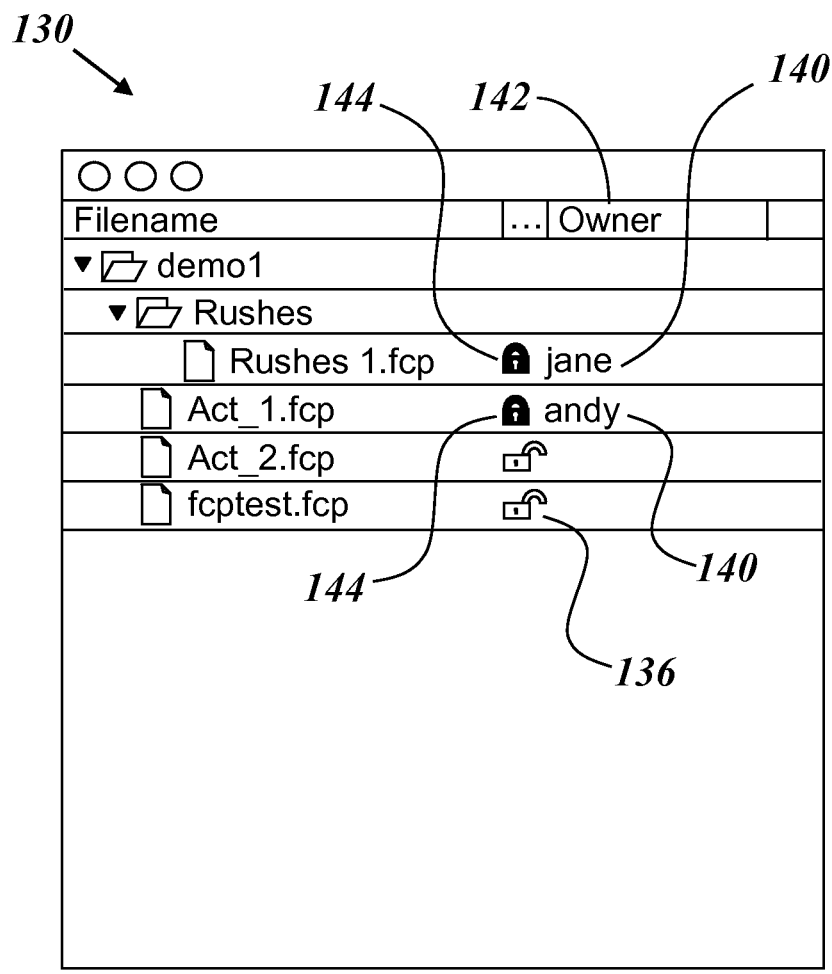
FIG. 4B is a screen shot of the user client of FIG. 4A, subsequent to an action by the editor user, "jane", according to example aspects of the present invention.

A similar manner, FIGS. 4A and 4B depict jeff's browser window 130 before and after (respectively) an action by another editor user 124 named "Jane" of checking out and receiving ownership of the file "Rushes 1.fcp" by instructing the permissions module 110 to transfer ownership from the server user 112 to Jane. In FIG. 4A, the file "Rushes_1.fcp" is accompanied by a claimable file indicator 143, which indicates that the file is owned by the server user 112 and is capable of file being checked out by jeff. In FIG. 4B, on the other hand, the browser window 130 has been updated such that the file "Rushes_1.fcp" is instead accompanied by a locked file indicator 144, which to indicate to jeff that another user (Jane) has checked out the file "Rushes 1.fcp." In addition to automatically updating the file status indicators, the GUI generator 114 also automatically updates the browser window 130 to include the appropriate owner indicators 140, e.g., by adding the text "Jane" next to the text "Rushes 1.fcp."

Accordingly, using such a system of file status indicators, a personalized status of any file can be presented to any editor user 124 from that user's perspective of self-ownership or ownership by other editor users 124, as described herein. Similarly, the ownership indicators can provide personalized information to each user regarding who owns files that are checked out.

FIG. 5A depicts a method by which the system 100 allows an editor user 124 to assume ownership, according to embodiments of the present invention. Ownership of a file 118 stored in the directory 116 can be initially assigned, using at least one processor, to an owner (step 510). This can occur, for example, upon creating or importing a file 118. The initial owner can be automatically assigned to be the particular editor user that created the file 118. Alternatively, the initial owner can be the server user 112, or any other suitable user. In an example embodiment, ownership of the files 118 in the directory 116 is transferrable at least between any one of the members of the user group 126 and the server user 112. The permissions module 110 receives, through at least one input device, an instruction from any one of the one or more editor users 124 to assume ownership of a file 118 (step 512). More specifically, the instruction received in step 512 is an instruction to transfer ownership from the server user 112 to the editor user 124 from whom the instruction is received in step 512. Upon receiving the instruction, the permissions module 110 transfers, using at least one processor, ownership of the requested file 118 from the server user 112 to the user that sent the instruction (step 514).

Based on changing ownership of the file 118, the permissions module 110 can instruct the GUI generator 114 to update, using at least one processor, the corresponding ownership indicators and the corresponding file status indicators for each user client 128 (step 516), in a manner so as to provide each editor user 124 with a personalized perspective of ownership of and availability to check out the files 118. Depending on the details of the changes in file status and ownership, step 516 can include any of: indicating to any editor user that does not have ownership of the file 118 that the file 118 is locked and is checked out, indicating to any editor user that does have ownership of the file 118 that the file 118 is unlocked and is checked out, and indicating the name of an editor user with ownership of the file 118 to any editor user who does not have ownership that the file 118.

FIG. 5B depicts a method by which the system 100 allows an editor user 124 to relinquish ownership, according to embodiments of the present invention. Ownership of a file 118 stored in the directory 116 can be initially assigned, using at least one processor, to an owner (step 518), as described above with reference to step 510 from FIG. 5A. The system 100 then receives, through at least one input device, an electronic instruction from any one of the one or more editor users 124 to relinquish ownership of a file 118 (step 520). More specifically, the instruction received in step 520 is an instruction to transfer ownership to the server user 112 from the editor user 124 from whom the instruction is received in step 520. Upon receiving the instruction, the permissions module 110 transfers, using at least one processor, ownership of the requested file 118 from the server user 112 to the user that sent the instruction (step 522). Based on changing ownership of the file 118, the permissions module 110 can instruct the GUI generator 114 to update, using at least one processor, the corresponding ownership indicators and the corresponding file status indicators for each user client 128 (step 524), as previously described herein with reference to step 516 of FIG. 5A. For example, step 524 can include indicating to all of the users that no editor user has ownership of the file 118 and the file 118 is available to be checked out.

In addition, editor users 124 can be provided with the capability to create new files 118 within existing directories for which they are granted access, as well as the capability to create new directories and/or sub-directories. Permissions 122 to a new file 118 can be generated from a predetermined set of permissions and can be automatically assigned in any number of ways. For example, the permissions 122 on a new file 118 may be automatically assigned based on preprogrammed settings in permissions module 110, may be based on selections by the editor user 124 creating the file 118, may be based on selections of a system administrator or root level user, may be based on the directory 116 in which it was created, may be based on other files 118 within the directory 116 in which it was created, may be based on other factors, or may be based on any suitable combination thereof. In an example embodiment, ownership of a new file 118 is automatically assigned to the editor user 124 that created the new file 118.

When creating a new directory 116, an editor user 124 can be enabled to select one or more editor users 124 to be included in the user group 126 associated with the new directory 116. Alternatively, membership of the editor users 124 in a new directory 116 can be based on, e.g., an assignment of a specific group of editor users 124 to a project space with which the directory 116 is contained. For example, in illustrative embodiments, the project space is a top-level directory to which a plurality of editor users 124 are assigned and which contains the directory 116, such that any new directories 116 created by the editor users 124 in the project space are automatically assigned to the same group of editor users 124 assigned to the project space. Furthermore, the permissions 120 to the new directory 116 can be generated from a predetermined set of permissions 120 and can be assigned in any number of ways, e.g., to achieve the functionality described previously herein. For example, the permissions 120 on new directories 116 can be automatically assigned based on preprogrammed settings in the permissions module 110, can be based on selections by the editor user 124 creating the directory, can be based on selections of a system administrator or root level user, can be based on other the permissions 120 of existing directories 116, can be based on the permissions set to the project space, can be based on other factors, or can be based on any suitable combination thereof. In an example embodiment, ownership of a new file 118 is automatically assigned to the editor user 124 that created the new file 118.

Embodiments of the present invention can be implemented for shared projects of NLE programs, which require multiple editors to work collaboratively together on the same metadata defining, e.g., a single project. This specifically can include NLE software applications that save metadata as a project files (e.g., in "monolithic" files) such as FINAL CUT PRO®, manufactured and sold by the company, Apple, Inc. Likewise, embodiments of the present invention can further be implemented on other NLE products and software that store metadata in discrete sub-units, or bin files, such as those NLE software applications provided by Avid Technology, Inc., of Burlington, Mass.

Additional features can be implemented in accordance with the present invention. For example, on the client side of the system, if an editor user 124 selects a particular file 118 (e.g., by clicking on a file name or on a corresponding display icon), the file 118 will opened in a corresponding NLE application. This capability is not presently available in several conventional NLE applications. That is, absent the implementation of the present invention, in many NLE applications a user cannot navigate to a file location in, e.g., Windows® Explorer (manufactured and sold by Microsoft Corporation, headquartered in Redmond, Wash.), and select the file to be opened without receiving an error message.

In addition, when a user opens a file 118 through a client application implemented in accordance with the present invention, if the file 118 is owned by another editor user (e.g., editor user 124, which results in read-only access), the client application can present a warning message, such as "You are opening a Project File with Read Only permissions. Any changes you make cannot be saved. What do you want to do?" The client application then can present the user with several options, such as Cancel (cancel the action of opening the file 118), Proceed Read Only (open the file 11R in a read-only mode), or the like.

Similarly, when a user opens a file 118 through a client application implemented in accordance with the present invention, if the file 118 is owned by the server user 112 and the file 118 is therefore available for the user to take ownership, the client application can provide a warning message, such as, "You are not the owner of this Project File. Your changes will not be saved unless you take ownership. Do you want to take ownership?" The client application can then present the user with several options, such as Cancel (cancel the action of opening the file 118), Proceed Read Only (open the file 118 in a read-only mode), Take Ownership (send an instruction to the system 100 to assume ownership of the file 118), Open, and/or the like. Accordingly, in such situations, users can have the ability to assume ownership upon opening the file 118, without first having to click on the corresponding claimable file indicator 143.

Accordingly, the system 100 enables a group of editor users 124 assigned to an NLE project to exchange exclusive write access to metadata by assuming and relinquishing ownership of files containing the metadata. Ownership is transferred through the intermediary of the server user 112. This can be performed without moving the location of files 118 containing the metadata and without creating duplicates, copies, or versions of the files 118. Furthermore, each editor user 124 is enabled to view a personalized GUI presenting the files 118 forming the NLE project in one of three states: locked (checked out for write access and thus owned by another editor user 124); unlocked (checked out for write access and thus owned by the editor user 124 to whom the GUI is personalized); and claimable (owned by the server user 112 and able to be checked out).

FIG. 6 illustrates an example computing device 600 within an illustrative operating environment for implementing illustrative methods and systems of the present invention. The computing device 600 is merely an illustrative example of a suitable computing environment and in no way limits the scope of the present invention. A "computing device," as represented by FIG. 6, can include a "workstation," a "server," a "laptop," a "desktop," "hand-held device," a "mobile device," a "tablet computer," or other computing devices, as would be understood by those of skill in the art. Given that the computing device 600 is depicted for illustrative purposes, embodiments of the present invention may utilize any number of computing devices 600 in any number of different ways in order to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 6 is merely illustrative of an exemplary computing device that can be used to implement one or more embodiments of the present invention, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 200.

The memory 612 can include computer-storage media in the form of volatile and/or nonvolatile memory. The memory 612 may be removable, non-removable, or any combination thereof. Exemplary hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Exemplary presentation components include a display device, speaker, printing component, vibrating component, etc.

The I/O ports 618 can allow the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

FIGS. 7 through 10 are screen shots depicting ownerships and permissions, e.g., as would be viewed from a server terminal. In particular, FIGS. 7 through 10 depict changes in the ownerships and permissions that are made by the permissions module 110 based on receiving various instructions from the editor users 124. In the example embodiment of FIGS. 7 through 10, the server user 112 is provided with the user name "editshare." The user names "andy" and "jeff" represent two editor users 124 that are included in a user group 126 entitled "editors." FIGS. 7 and 8 depict changes in the ownerships and permissions for an example directory entitled "demo1," as well as for the files contained in the example directory "demo1." As seen in FIG. 7, the ownerships and permissions indicate that the file "Act_2.fcp" is owned by the server user ("editshare"). FIG. 8 depicts the ownership and permissions of the file "Act_2.fcp" after the editor user 124 named jeff sends the system 100 an instruction to assume ownership (and thus write access) of the file "Act_2.fcp." As seen in FIG. 8, subsequent to the submission of the instruction from jeff to assume ownership, the file "Act_2.fcp" is owned by jeff. If subsequent to receiving ownership of the file "Act_2.fcp," jeff were to submit an instruction to relinquish ownership of the file "Act_2.fcp" to the system 100, then the permissions and ownerships would return to the state depicted in FIG. 7.

Similarly, FIGS. 9 and 10 depict the permissions and ownerships for a sub-directory "Rushes" of the directory "demo1," as well as the file contents in the sub-directory "Rushes." As depicted in FIG. 9, the file "Rushes 1.fcp" is initially owned by the server user 112. FIG. 10 depicts the ownership and permissions for the sub-directory "Rushes" and its contents subsequent to an editor user named "Jane" sending an instruction to the system 100 to assume ownership of (and thus write access to) the file "Rushes_1.fcp."

Embodiments of the present invention provide numerous benefits over existing systems. For example, editor users can be provided with automated control over access rights to files while maintaining a convenient user client where the files, files statuses, and owners, can easily be located and comprehensively viewed. Additionally, embodiments of the present invention can enable convenient file sharing without the need for moving files, creating copies of files, or having permissions assigned manually, for example by a non-automated system administrator. Other benefits will be appreciated by one skilled in the art upon reading the present specification.

The present invention has been described herein with reference to illustrative implementations for NLE software applications that store metadata defining an NLE project in the form of files (e.g., bin files, "monolithic" project files, etc.). However, in other embodiments, metadata is stored in different formats. For example, in some illustrative alternative embodiments according to the present invention, the metadata defining one or more NLE project(s) are stored collectively in a database (e.g., all in a single database file). In these alternative embodiments, each metadata element is stored as one or more database objects/entries, as would be appreciated by one of skill in the art upon reading the present specification. As with the files 118 described previously herein, the system 100 can enable exchange of exclusive write permissions to metadata stored in a database by transferring ownership of the database objects in which the metadata is stored. As with the embodiments of FIGS. 1 through 10, each editor user 124 can be provided with a GUT presenting the database objects forming the NLE project in one of three states: locked (checked out for write access and thus owned by another editor user 124); unlocked (checked out for write access and thus owned by the editor user 124 to whom the GUI is personalized); and claimable (owned by the server user 112 and able to be checked out).

In such embodiments in which metadata is stored in a database (e.g., a MySQL database provided by Oracle Corporation headquartered in Redwood City, Calif., or a PostgreSQL database provided by the PostgreSQL Global Development Group, as would be appreciated by those of skill in the art), the metadata in the database can be organized into "virtual directories" through the use of specific labels and/or other fields. More specifically, each of the database objects forming the metadata can be labeled, tagged, etc. as having a specific location in a fictional directory structure. Accordingly, the labels, tags, etc. enable the metadata to be manipulated (e.g., organized, sorted, filtered, owned, etc.) in a manner similar to traditional directory structures. As one illustrative and non-limiting example, each metadata element can be tagged with an appropriate file path in a fictional hierarchical directory, thereby allowing the metadata element to be manipulated in accordance with the same organizational structure that a conventional hierarchical directory enables.

Upon reading the present specification, one of skill in the art will appreciate yet other suitable ways for storing and organizing metadata defining one or more NLE projects. All such alternatives and modifications are contemplated within the scope of the present invention, to the extent that such alternative formats and storage mechanisms enable transfer of ownership between the editor users 124 through the intermediary of the server user 112. The present invention is not exclusively limited to the exemplary and illustrative embodiments described herein.

Embodiments of the present invention additionally can be implemented with numerous additional features. As one non-limiting example, in some embodiments, once an editor user 124 logs out of the NLE software application (which the editor user 124 uses to modify and save metadata owned by the editor user 124), the system 100 automatically transfers the ownership of any metadata owned at that time by that editor user 124 to the server user 112. In other embodiments, once an editor user 124 logs out of the NLE software application, the system 100 allows the editor user 124 to retain ownership of any metadata owned by that editor user 124 at that time. In yet other embodiments, the system 100 provides editor users 124 with both of the foregoing options (e.g., the first option to automatically "check in" any metadata checked out by the editor user 124 at the time that the editor user 124 logs out of the NLE software application, and the second option to retain ownership of any metadata checked out by the editor user at the time of logging out of the NLE software application). For example, the system 100 can be configured to present editor users 124 with both options and to allow some or all of the editor users 124 to select a preferred option to serve as the default behavior by the system 100.

Figure 11:
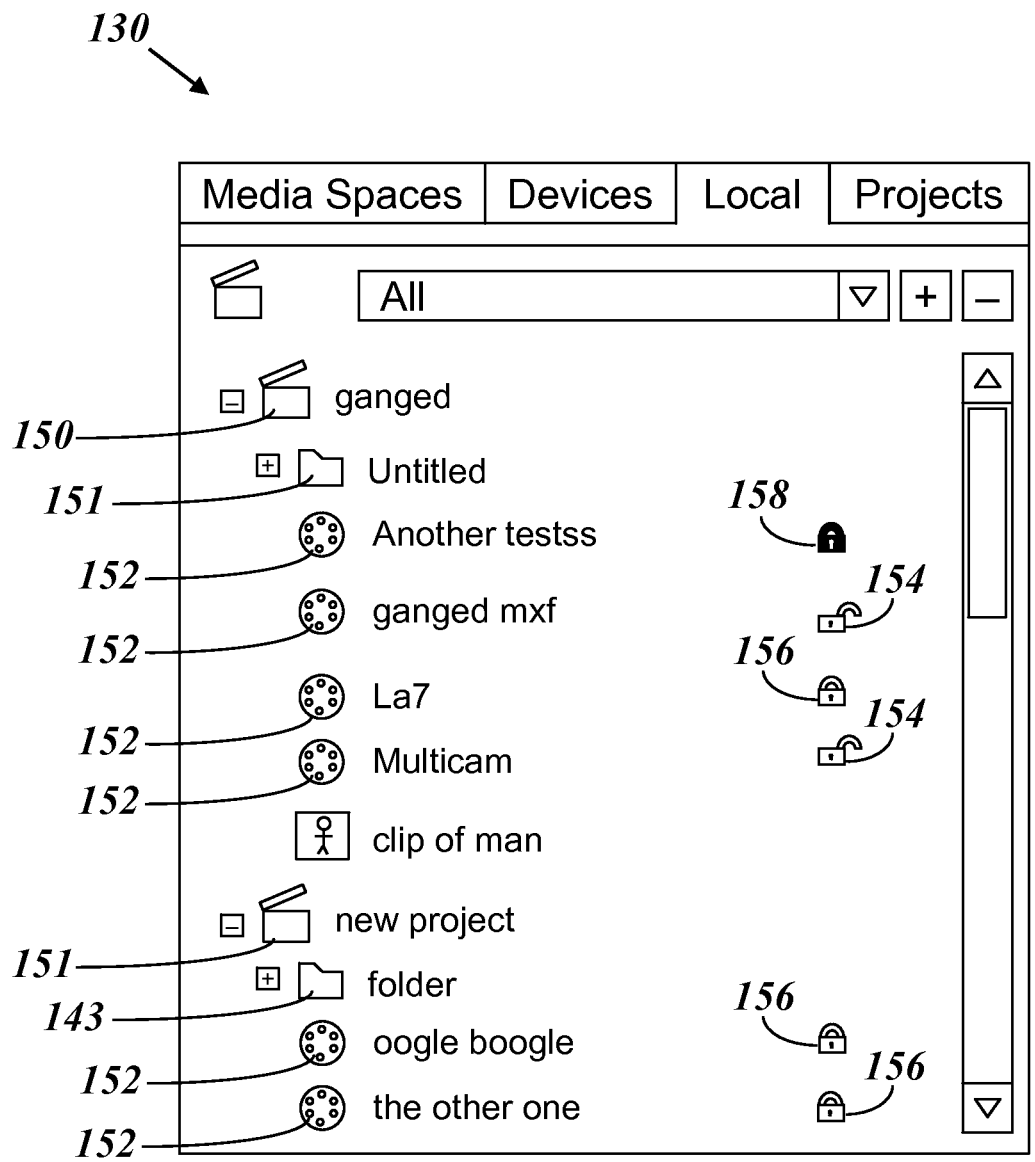
FIG. 11 is a screen shot of browser window including various metadata status indicators implemented for metadata stored in a database, according to an example embodiment of the present invention.

For example, FIG. 11 depicts another embodiment of the browser window 130 adapted for a system 100 in which the metadata defining or contributing to an NLE project is all stored in one or more databases. Accordingly, each metadata is stored in the form of one or more database entries and/or as one or more database objects. In such embodiments, as described previously herein, control over exclusive write access to the various metadata is achieved by transferring ownership of the specific database objects/entries containing the metadata.

As with the embodiment of FIGS. 3A through 4B, the browser window 130 of FIG. 11 displays the statuses of the plurality of metadata defining an NLE project to a particular editor user assigned to the NLE project. The browser window 130 of FIG. 11 generally can be any suitable electronic interactive display of information. As described previously herein, the browser window 130 is personalized for a particular editor user, and displays the status of each metadata (e.g., capable of being checked out by you, owned by another editor user that is not you, etc.) from the perspective of the particular editor user. The browser window 130 generally can be generated (by the GUI generator 114) for each editor user that is assigned to an NLE project, such that each editor user is provided with a personalized presentation of the status of the metadata for the NLE projects to which he or she is assigned.

In the example embodiment of FIG. 11, the browser window 130 includes one or more project folders 150 each indicating a "virtual directory" (as described previously herein) for metadata stored in a database stored on a non-transitory computer readable storage device. Each project folder 150 is associated with a specific NLE project, and each project folder 150 defines (e.g., through the use of database labels, tags, or other fields) a specific set of metadata stored in the database and associated with the NLE project. Contained in the project folders are additional folder indicators 151 indicating "virtual sub-directories" hierarchically below the virtual directory indicated by the project folder 150. Furthermore, the browser window also includes the metadata indicators 152 representing the metadata forming the NLE project.

As with the embodiment of FIGS. 3A through 4B, the browser window 130 includes a metadata status indicator for each metadata represented by one of the metadata indicators 152. Furthermore, like the example embodiments of FIGS. 3A through 4B, each of the metadata status indicators is one of: an unlocked metadata indicator 154 (e.g., comparable to the unlocked file indicator 136), a claimable metadata indicator 156 (e.g., comparable to the claimable file indicator 143), or a locked metadata indicator 158 (e.g., comparable to the locked file indicator 144). The locked metadata indicator 158 can indicate that the particular metadata has been checked out by another editor user besides the editor user for whom the browser window 130 is personalized, is owned by another editor user besides the editor user for whom the browser window 130 is personalized, and is read only to the editor user for whom the browser window 130 is personalized. The claimable metadata indicator 156 can indicate that the particular metadata is available to be checked out and thereby "claimable" by the editor user for whom the browser window 130 is personalized. The unlocked metadata indicator 154 can indicate that the particular metadata is checked out by the editor user for whom the browser window 130 is personalized, owned by the editor user for whom the browser window 130 is personalized, and writable only by the editor user for whom the browser window 130 is personalized (e.g., with the exception of super users, root users, special privilege users, etc.).

As with the example embodiments of FIGS. 3A through 4B, in the example embodiment of FIG. 11, the locked metadata indicator 158 includes a solid, closed icon of a lock. The unlocked metadata indicator 154 includes an open icon of a lock. The claimable file indicator 143 includes a hollow, closed icon of a lock. Additionally or alternatively, the metadata status indicators 136, 143, 144 can be color-coded, to provide similar indication to users of the status of the associated files. The browser window 130 of FIG. 11 also can include the owner indicators 140 (not shown in FIG. 11) indicating which particular editor user 124 owns a particular file that is checked out.

The metadata described herein includes any metadata that defines, contributes to, or is otherwise associated with an NLE project. Accordingly, the metadata can include references to clips, timecodes, edit decisions, notes, and any other metadata. Upon reading the present specification, one of skill in the art will appreciate a wide variety of other types of metadata associated with NLE projects that can be edited, deleted, moved, or otherwise modified. All such metadata is contemplated within the scope of the present invention and can be implemented with embodiments of the present invention.

Numerous modifications and alternative embodiments of the present invention will be apparent to those skilled in the art in view of the foregoing description. For example, in some alternative embodiments of the present invention, editor users 124 are enabled to transfer ownership of metadata to each other directly, without the step of passing ownership of the metadata to the intermediary of the server user 112. Accordingly, in such alternative embodiments, the editor users 124 are enabled to instruct the system 100 to relinquish or cede ownership of metadata (e.g., stored in a file 118, stored in a database object, etc.) directly to another editor user 124. Accordingly, this description is to be construed as illustrative only and is for the purpose of teaching those skilled in the art the best mode for carrying out the present invention, Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented project sharing system, comprising:
    metadata stored in a non-transitory computer readable storage device, the metadata defining a part of a non-linear video editing project;
    a permissions module configured to assign permissions on the metadata stored in a non-transitory computer readable storage device, the permissions enabling a group of one or more editor users to read the metadata and enabling only one of the one or more editor users with ownership of the metadata permission to modify or delete the metadata;
    a server device configured to control write access permissions to the metadata by transferring, using at least one processor, ownership of the metadata to or from an intermediary server user that is a fully automated user entity and not an editor user, wherein the transferring comprises:
        the server device providing instructions to the permissions module to relinquish or assume the ownership of the metadata to or from the intermediary server user; and
        the permissions module updating an ownership indictor and a current status indicator associated with the metadata;
    wherein the permissions module is configured to transfer ownership of the metadata from or to one of the one or more editor users to or from the intermediary server user, and wherein the intermediary server user is controlled by the server device;
    wherein when a first editor user of the one or more editor users has ownership of the metadata, the first editor user is enabled to relinquish ownership of the metadata by instructing the permissions module of the server device to transfer ownership of the metadata to the intermediary server user and each of the one or more editor users without ownership of the metadata is not enabled to instruct the permissions module of the server device to transfer ownership of the metadata; and
    wherein when the intermediary server user has ownership of the metadata, any one of the one or more editor users is enabled to assume ownership of the metadata by instructing the permissions module of the server device to transfer ownership of the metadata from the intermediary server user to that one of the one or more editor users; and
    wherein the transferring the ownership of the metadata does not require creation of copies or versions of the metadata, or moving a location of the metadata.

2. The system of claim 1, wherein the metadata is stored in a file stored in a directory, and wherein the permissions on the metadata comprise directory-level permissions and file-level permissions.

3. The system of claim 2, wherein the directory-level permissions include a sticky bit.

4. The system of claim 1, wherein the metadata is stored in one or more database entries of a database.

5. The system of claim 1, further comprising instructions stored on at least one non-transitory computer readable device, wherein execution of the instructions by at least one processor causes the graphical user interface to be presented on at least one presentation device, the graphical user interface enabling instructions to transfer ownership of the metadata to be sent to the server device.

6. The system of claim 5, wherein the graphical user interface comprises the current status indicator for the metadata, the current status indicator indicating, to one of the one or more editor users, that the metadata is currently available to be checked out, currently checked out by that one of the one or more editor users, or currently checked out by a different one of the one or more editor users.

7. The system of claim 1, wherein the server device runs on a Linux based, a Unix based, or a Unix-like operating system.

8. A computer implemented method, comprising:
    setting, using at least one processor, permissions on metadata stored in a non-transitory computer readable storage device, the permissions enabling a group of one or more editor users to read the metadata and enabling only one of the one or more editor users with ownership of the metadata permission to modify or delete the metadata;
    controlling write access to the metadata by transferring, using at least one processor and upon receiving an instruction through at least one input device, ownership of the metadata to or from an intermediary server user that is a fully automated user entity and not an editor user, wherein the transferring comprises:
        providing instructions to a permissions module to relinquish or assume the ownership of the metadata to or from the intermediary server user; and
        the permissions module updating an ownership indictor and a current status indicator associated with the metadata;
    wherein the permissions module is configured to transfer ownership of the metadata from or to one of the one or more editor users to or from the intermediary server user, and wherein the intermediary server user is controlled by a server device;

wherein when a first editor user of the one or more editor users has ownership of the metadata, the first editor user is enabled to relinquish ownership of the metadata by instructing permissions module of the server device to transfer ownership of the metadata to the intermediary server user and each of the one or more editor users without ownership of the metadata is not enabled to instruct the permissions module of the server device to transfer ownership of the metadata; and wherein when the intermediary server user has ownership of the metadata, any one of the one or more editor users is enabled to assume ownership of the metadata by instructing the permissions module of the server device to transfer ownership of the metadata from the intermediary server user to that one of the one or more editor users; and wherein the transferring the ownership of the metadata does not require creation of copies or versions of the metadata, or moving a location of the metadata.

9. The computer implemented method of claim 8, wherein the first user has ownership of the metadata, and wherein the method further comprises:

receiving, through at least one input device, an instruction from the first user editor to relinquish ownership of the metadata; and based on the received instruction, transferring, using the at least one processor, ownership of the metadata from the first user to the intermediary server user.

10. The computer implemented method of claim 8, wherein the intermediary server user has ownership of the metadata, and wherein the method further comprises:

receiving, through at least one input device, an instruction from one of the one or more user editors to assume ownership of the metadata; and based on the received instruction, transferring, using the at least one processor, ownership of the metadata from the intermediary server user to the one of the one or more user editors.

11. The computer implemented method of claim 8, wherein the metadata is stored in a file stored in a directory, and wherein the permissions on the metadata comprise directory-level permissions and file-level permissions.

12. The computer implemented method of claim 11, wherein the directory-level permissions include a sticky bit.

13. The computer implemented method of claim 8, wherein the metadata is stored in one or more database entries of a database.

14. The computer implemented method of claim 8, further comprising instructions stored on at least one non-transitory computer readable device, wherein execution of the instructions by at least one processor causes the graphical user interface to be presented on at least one presentation device.

15. The computer implemented method of claim 14, wherein the graphical user interface comprises the current status indicator for the metadata, the current status indicator indicating, to one of the one or more editor users, that the metadata is currently available to be checked out, currently checked out by that one of the one or more editor users, or currently checked out by a different one of the one or more editor users.

16. An interactive electronic display of information for a first editor user of a non-linear video editing program, the first editor being assigned to a non-linear video editing (NLE) project comprising a plurality of metadata, the display comprising:

a plurality of metadata indicators representing the plurality of metadata defining the non-linear video editing project, wherein each metadata of the plurality of metadata is owned either by an editor user representing an editor assigned to the NLE project or by an intermediary server user that is a fully automated user entity and does not represent an editor user assigned to the NLE project; and for each metadata of the plurality of metadata, an associated status indicator selected from the group consisting of:

a first status indicator indicating ownership of the metadata by the intermediary server user;

a second status indicator indicating ownership of the metadata by the first editor user and identifies the first editor user as owner of the metadata; and a third status indicator indicating ownership of the metadata by another editor user that is not the first editor user and identifies another editor user as owner of the metadata;

wherein a permissions module updates the first status indicator, the second status indicator, or the third status indicator associated with the metadata; and wherein the first editor user is only permitted write access to the metadata of the plurality of metadata that is owned by the first editor; and wherein the transferring the ownership of the metadata does not require creation of copies or versions of the metadata, or moving a location of the metadata.

17. The electronic display of claim 16, wherein the first status indicator and the second status indicator are each selectable.

18. The electronic display of claim 17, wherein for each first status indicator included in the display, selection of the first status indicator causes the server device to transfer from the first user to the intermediary server user, using at least one processor, ownership of the metadata associated with the selected first indicator.

19. The electronic display of claim 17, wherein for each second status indicator included in the display, selection of the second status indicator causes the server device to transfer from the intermediary server user to the first user, using at least one processor, ownership of the metadata associated with the selected second indicator.

20. The electronic display of claim 16, further wherein for each metadata of the plurality of metadata: the first status indicator indicates that the first user editor owns the metadata and has checked out the metadata, the second status indicator indicates that the first editor user does not own the metadata and is enabled to check out the metadata, and the third status indicator indicates that the first editor user does not own the metadata and is not enabled to check out the metadata.

* * * * *